US012085257B1

(12) United States Patent
Ma

(10) Patent No.: US 12,085,257 B1
(45) Date of Patent: Sep. 10, 2024

(54) TWO-IN-ONE WALL LAMP

(71) Applicant: Shenzhen Hitoplux Optoelectronic Co., Ltd., Shenzhen (CN)

(72) Inventor: Yingshan Ma, Xiangtan Hunan (CN)

( * ) Notice: Subject to any disclaimer, the term of this patent is extended or adjusted under 35 U.S.C. 154(b) by 0 days.

(21) Appl. No.: 18/431,993

(22) Filed: Feb. 4, 2024

(51) Int. Cl.

| | |
|---|---|
| ***F21S 8/00*** | (2006.01) |
| ***F21S 10/02*** | (2006.01) |
| ***F21V 1/14*** | (2006.01) |
| ***F21V 5/04*** | (2006.01) |
| ***F21V 7/05*** | (2006.01) |
| ***F21V 15/01*** | (2006.01) |
| ***F21V 17/12*** | (2006.01) |
| ***F21V 23/00*** | (2015.01) |
| ***F21V 29/76*** | (2015.01) |
| ***F21V 31/00*** | (2006.01) |

(52) U.S. Cl.
CPC ............... *F21S 8/033* (2013.01); *F21S 10/02* (2013.01); *F21V 1/146* (2013.01); *F21V 5/04* (2013.01); *F21V 7/05* (2013.01); *F21V 15/01* (2013.01); *F21V 17/12* (2013.01); *F21V 23/009* (2013.01); *F21V 29/76* (2015.01); *F21V 31/005* (2013.01)

(58) Field of Classification Search
CPC ........... F21S 8/033; F21S 10/02; F21V 1/146; F21V 5/04; F21V 7/05; F21V 15/01; F21V 17/12; F21V 23/009; F21V 29/76; F21V 31/005
See application file for complete search history.

(56) References Cited

U.S. PATENT DOCUMENTS

| | | | | |
|---|---|---|---|---|
| 4,680,684 | A * | 7/1987 | Wolber | F21S 8/033 362/339 |
| 5,546,292 | A * | 8/1996 | Shemitz | F21S 8/033 362/147 |
| 7,874,696 | B2 * | 1/2011 | Engel | F21S 8/033 362/147 |
| 9,869,457 | B1 * | 1/2018 | Lin | F21V 23/009 |
| 10,627,059 | B2 * | 4/2020 | Duckworth | F21V 21/30 |
| 2014/0177228 | A1 * | 6/2014 | Ellingson | F21V 29/89 362/373 |
| 2015/0351195 | A1 * | 12/2015 | Sargent | F21V 15/01 315/158 |
| 2017/0307145 | A1 * | 10/2017 | Hollander | F21S 8/033 |
| 2017/0370565 | A1 * | 12/2017 | Chami | F21V 3/00 |
| 2018/0299096 | A1 * | 10/2018 | Zhou | F21V 5/048 |
| 2020/0132264 | A1 * | 4/2020 | Scarlata | F21V 15/01 |
| 2021/0332959 | A1 * | 10/2021 | Li | F21V 17/16 |

* cited by examiner

*Primary Examiner* — Tsion Tumebo

(57) ABSTRACT

A two-in-one wall lamp is disclosed, including a lamp body, a first lamp panel, a second lamp panel, a lens, and a lampshade. Bottom of the lamp body is configured with a first accommodating cavity having an opening downward, and the first accommodating cavity has a horizontal plane facing downward. A front side of the lamp body is configured with a second accommodating cavity having an opening forward, and the second accommodating cavity has an inclined plane facing lower forward. The first lamp panel is affixed to the horizontal plane for fixation and also located in the first accommodating cavity, and the second lamp panel is affixed to the inclined plane for fixation and also located in the second accommodating cavity. The two-in-one wall lamp can switch different angles of light output, which not only easy to operate and use, but also to meet lighting angle requirements.

10 Claims, 6 Drawing Sheets

TWO-IN-ONE WALL LAMP

TECHNICAL FIELD

The present application relates to the technical field of lamps and lanterns, and in particular to a two-in-one wall lamp.

BACKGROUND

Wall lamps are mainly installed in balconies, stairs, corridors and bedrooms, and are suitable for use as ever-burning lamps. Color-changing wall lamps are mostly used for festivals and celebrations. Most of bedside wall lamps are installed on an upper left side of a bed, its lamp base may be rotated in universal rotation, and a beam of light is concentrated, easy to read. Mirror wall lamps are mostly decorated in washroom near a mirror to use. An installation height of the wall lamps should be slightly more than a sight line 1.8 meters high or so, and the wall lamps should not be too much illumination, so that more artistic infectivity. Lampshades of the wall lamps should be selected based on wall colors, it is appropriate to use light green or light blue lampshade for white or cream yellow wall; and it is appropriate to use cream, light yellow or teal lampshade for lake green and sky blue walls. In this way, for a large area of one color background wall cloth, which is embellished with a conspicuous wall lamp, thereby giving a sense of elegant and freshness.

A main structure of current wall lamps includes a lamp body, a lamp panel and a lampshade, where the lamp panel is set on the lamp body, and the lampshade is set on the lamp body and covers the lamp panel. Wall lamps in existing technologies each only has a lamp panel, a light angle, with full-cut-off angle or half cut-off angle, which is not conducive to angle needs of different sites. Moreover, traditional wall lamps each only has a single color temperature and a single power, and cannot be flexibly switched for applications if venue demands different color temperature and power. In addition, light sensing requirements of the traditional wall lamps require additional functional components that are inconvenient to use. Therefore, it is necessary to improve the current wall lamps.

SUMMARY

In view of deficiencies of the existing technologies, the present disclosure aims to provide a novelty two-in-one wall lamp, which can effectively solve problems that the current wall lamps each only has one light output angle resulting in unfavourable angle requirements for different venues.

To achieve above objectives, the present disclosure adopts following technical solutions.

In some embodiments of the present disclosure, a two-in-one wall lamp is provided, including a lamp body, a first lamp panel, a second lamp panel, a lens, and a lampshade. Herein bottom of the lamp body is configured with a first accommodating cavity having an opening downward, and the first accommodating cavity has a horizontal plane facing downward. A front side of the lamp body is configured with a second accommodating cavity having an opening forward, and the second accommodating cavity has an inclined plane facing lower forward. The first lamp panel is affixed to the horizontal plane for fixation and also located in the first accommodating cavity, and the second lamp panel is affixed to the inclined plane for fixation and also located in the second accommodating cavity. The lens is a full cut-off lens, and the lens is configured to be disposed at the bottom of the lamp body and be sealed to cover the opening of the first accommodating cavity. The lampshade is a half cut-off light lampshade, and the lampshade is configured to be disposed on the front side of the lamp body and be sealed to cover the opening of the second accommodating cavity.

In some preferred embodiments of the present disclosure, the lens is fixedly connected to the lamp body by a plurality of first screws and a first waterproof ring is sandwiched between an inner circumferentia of the lens and the lamp body.

In some preferred embodiments of the present disclosure, the lampshade is fixedly connected to the lamp body by a plurality of second screws and a second waterproof ring is sandwiched between an inner circumferentia of the lampshade and the lamp body.

In some preferred embodiments of the present disclosure, the lamp body includes a front shell and a rear cover, the front shell and the rear cover are sealed front and rear and enclosed to form a closed chamber, the first accommodating cavity and the second accommodating cavity are located on the front shell and connected to the closed chamber.

In some preferred embodiments of the present disclosure, one side of the front shell is hinged with one side of the rear cover, and the other side of the front shell is secured to the other side of the rear cover by a fixing screw for locking connection.

In some preferred embodiments of the present disclosure, the one side of the front shell is configured with two rotary shaft holes arranged spaced upper and lower, the one side of the rear cover is configured with two pivot levers arranged spaced upper and lower accordingly, and the two pivot levers are respectively inserted in the two spindle holes for articulation.

In some preferred embodiments of the present disclosure, a sealing ring is sandwiched between the front shell and the rear cover.

In some preferred embodiments of the present disclosure, the front shell and the rear cover are made of thermally conductive metal materials.

In some preferred embodiments of the present disclosure, the closed chamber is configured with PC boxes, the PC boxes are configured with function control panels being connected to the first lamp panel, the second lamp panel or power supply.

In some preferred embodiments of the present disclosure, the PC boxes are two set on left and right, and are respectively located in a first PC box and a second PC box. Herein a function control panel in the first PC box is connected to the first lamp panel and the second lamp panel, and a function control panel in the second PC box is connected to the power supply.

In some preferred embodiments of the present disclosure, the function control panel in the first PC box is integrated with a switching color temperature function and a switching angle lighting function, and the function control panel in the second PC box is integrated with a switching power and light sensing function switch and an intelligent timer switch.

In some preferred embodiments of the present disclosure, the PC boxes are secured to the rear cover by locking screws.

In some preferred embodiments of the present disclosure, the front shell is configured with a plurality of radiator fins extending from thereon and the plurality of radiator fins are located below the rear cover.

In some preferred embodiments of the present disclosure, the rear cover is configured with a plurality of plugs.

In some preferred embodiments of the present disclosure, the rear cover is configured with a shock absorbing mounting pad.

In some preferred embodiments of the present disclosure, the second accommodating cavity is configured with a vertical plane inside, the vertical surface is located on a lower side of the inclined plane, and the vertical plane is configured with a reflective sheet.

In some preferred embodiments of the present disclosure, the reflective sheet is fixed on the vertical plane through a plurality of third screws.

In some preferred embodiments of the present disclosure, the vertical plane is rectangular, and correspondingly, the reflective sheet is also rectangular.

In some preferred embodiments of the present disclosure, the first lamp panel is secured to the horizontal plane through a plurality of fourth screws.

In some preferred embodiments of the present disclosure, the second lamp panel is secured to the inclined plane through a plurality of fifth screws.

As can be seen from above technical solutions, the present disclosure has obvious advantages and beneficial effects compared to the existing technologies, and it is described in detail as follows.

I. By setting the first lamp panel and the second lamp panel in the first accommodating cavity and the second accommodating cavity respectively, and also cooperatively setting the lens and the lampshade, herein the lens is the full cut-off lens and the lampshade is the half cut-off light lampshade, so that such product can contain two angles at the same time, and also can be switched to schemes of three angles, thereby switching different angles of light output, which not only easy to operate and use, but also to meet lighting angle requirements.

II. By integrating the functions of switching color temperature and switching angle light into the function control panel in one PC box, the product can switch the light angle at the same time, also can choose to switch different color temperature and different power, or combination of function selection, which can enrich different venues on the light angle of the lamp, as well as on the lamp color temperature and the lamp power of different needs.

III. By integrating the light sensing function switch and the intelligent timer switch into the function control panel in another PC box, so that the product can add switch function of the light sensing function switch at the same time, and it may choose whether the light sensing function is required. Moreover, the product also can add the intelligent timer switch, to meet needs of controlling lighting time and brightness degree of the lamp, thereby reducing energy waste.

Figure 1:
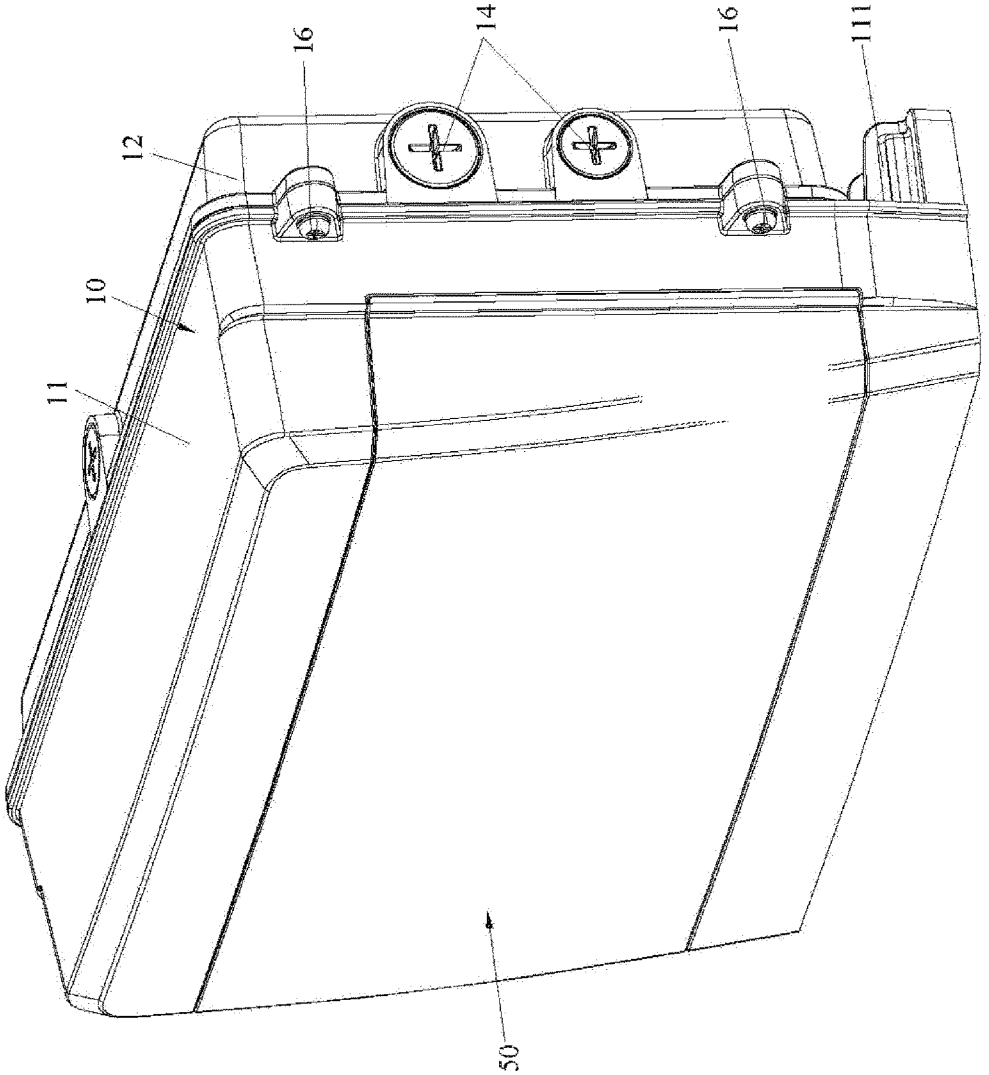
FIG. 1 is an assembled three-dimensional schematic diagram of a two-in-one wall lamp in accordance with some preferred embodiments of the present disclosure.

In the drawings, reference signs are as follows.

10 lamp body 11 front shell
111 radiator fins 112 rotary shaft hole
12 rear cover 121 pivot lever
13 sealing ring 14 plug
15 mounting pad 16 fixing screw
101 first accommodating cavity 1011 horizontal plane
102 second accommodating cavity 1021 inclined plane
1022 vertical plane 103 closed chamber
20 first lamp panel 21 fourth screw
30 second lamp panel 31 fifth screw
40 lens 41 first screw
42 first waterproof ring 50 lampshade
51 second screw 52 second waterproof ring
61 first PC box 62 second PC box
601 locking screw 70 reflective sheet
71 third screw 80 power supply

DETAILED DESCRIPTION OF THE EMBODIMENTS

Figure 2:
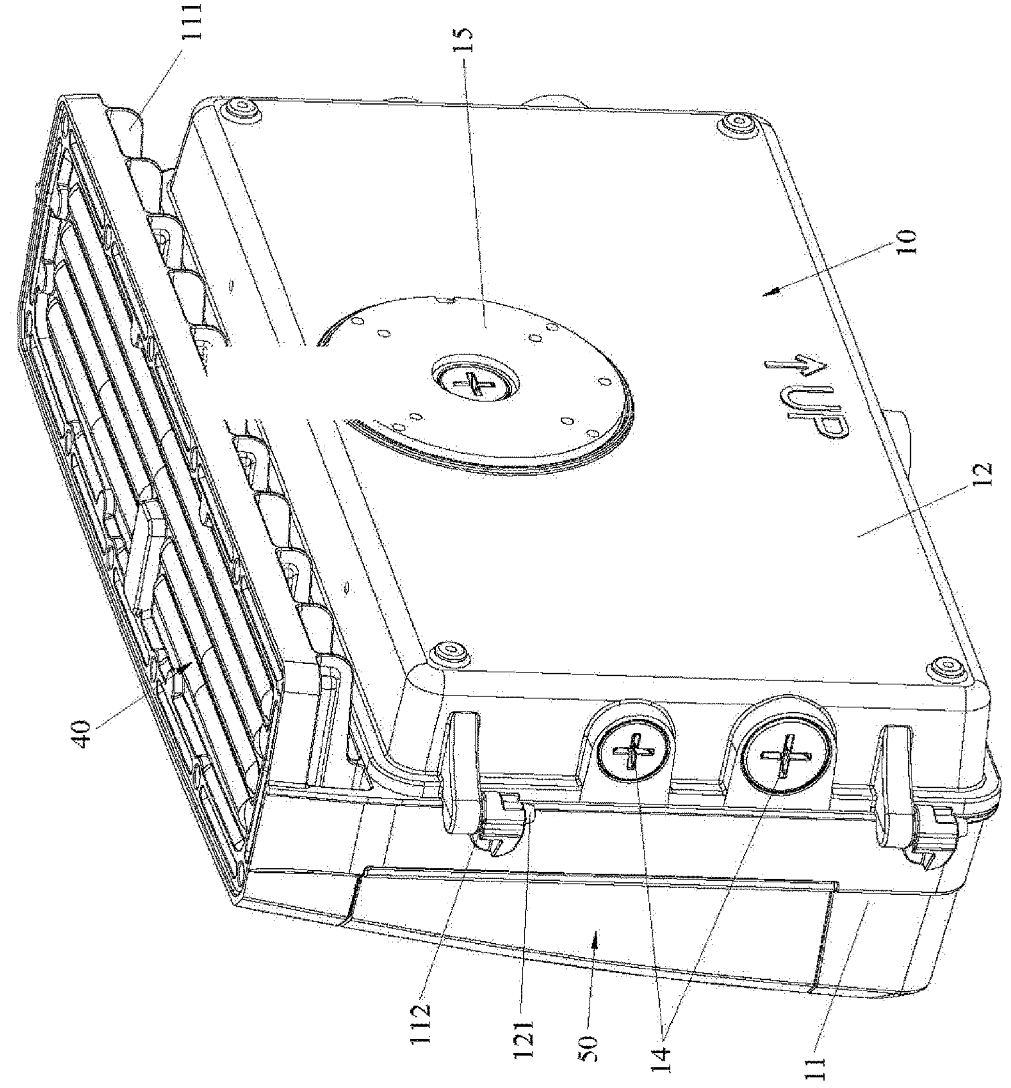
FIG. 2 is an assembled three-dimensional schematic diagram from another angle of the two-in-one wall lamp in accordance with some preferred embodiments of the present disclosure.
Figure 3:
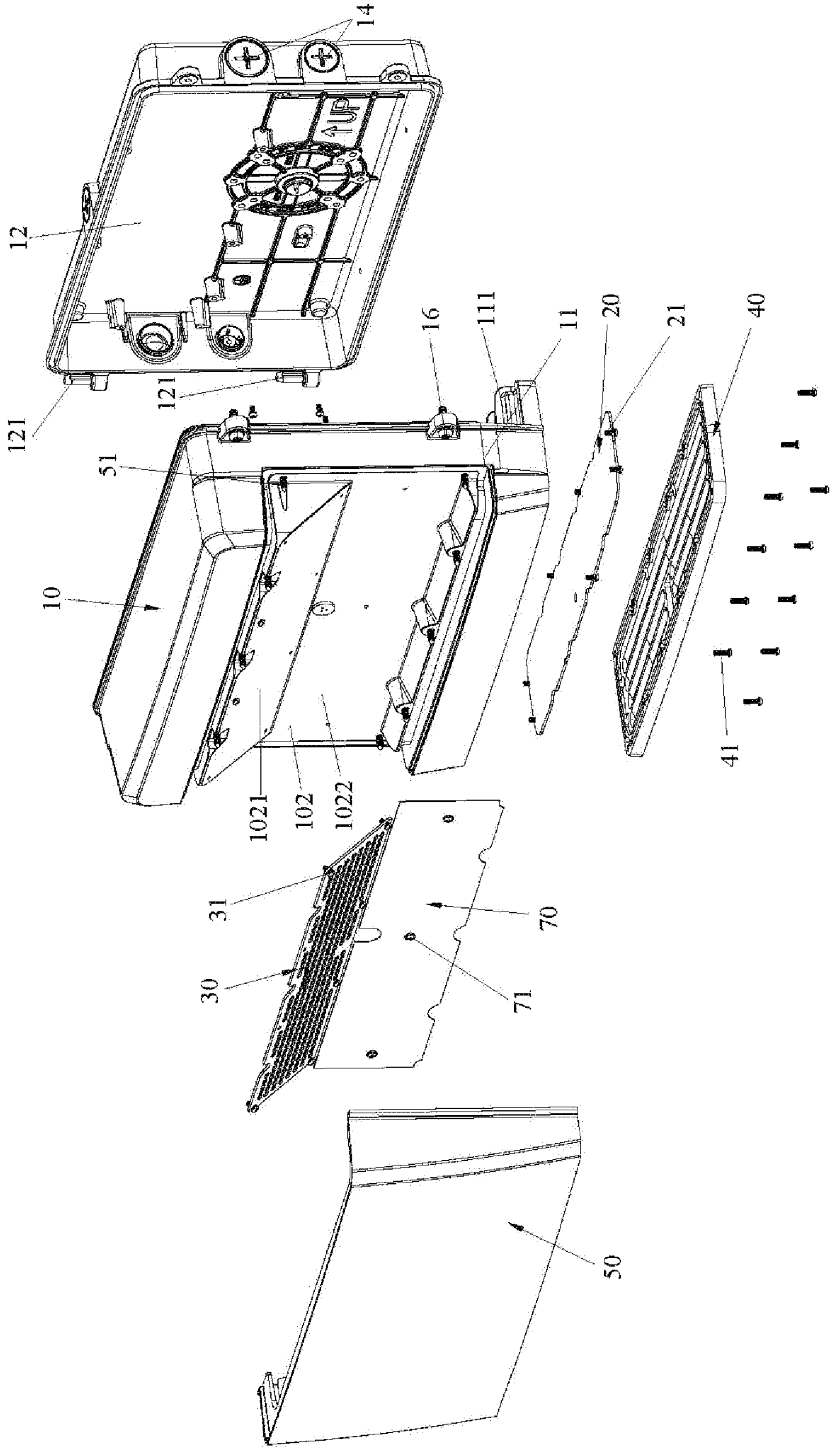
FIG. 3 is an exploded view of the two-in-one wall lamp in accordance with some preferred embodiments of the present disclosure.
Figure 4:
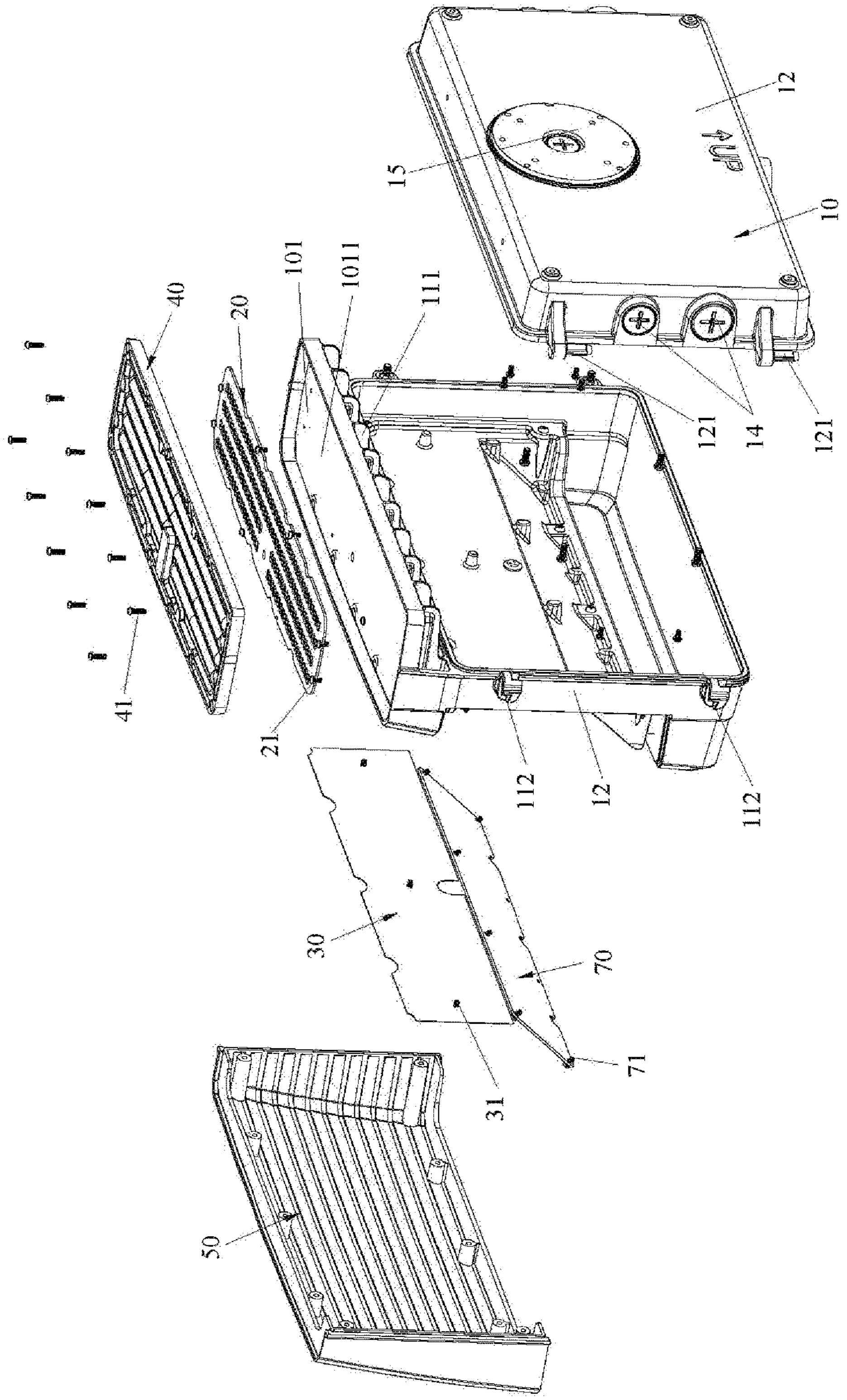
FIG. 4 is an exploded view from another angle of the two-in-one wall lamp in accordance with some preferred embodiments of the present disclosure.
Figure 5:
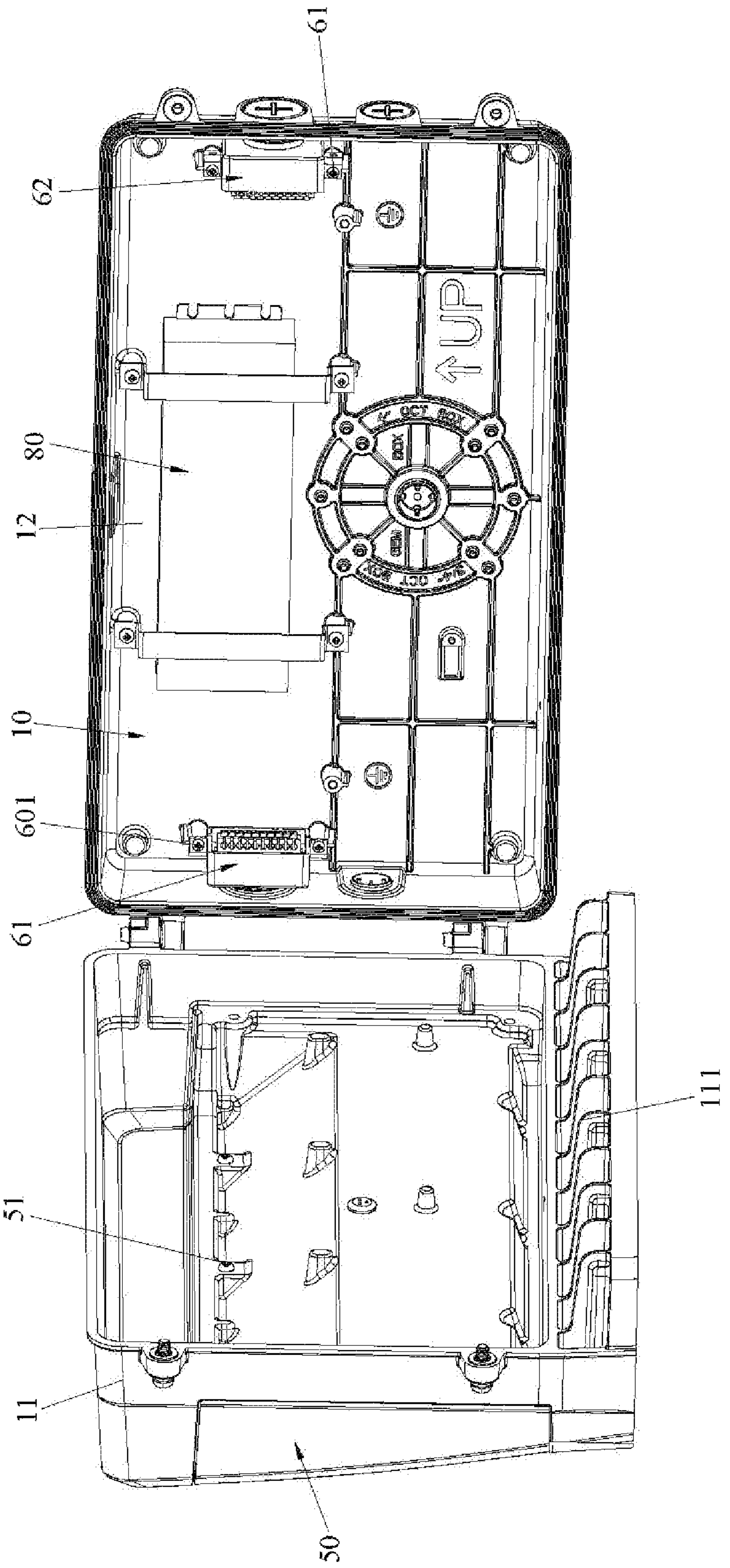
FIG. 5 is a schematic diagram of an open state of the two-in-one wall lamp in accordance with some preferred embodiments of the present disclosure.
Figure 6:
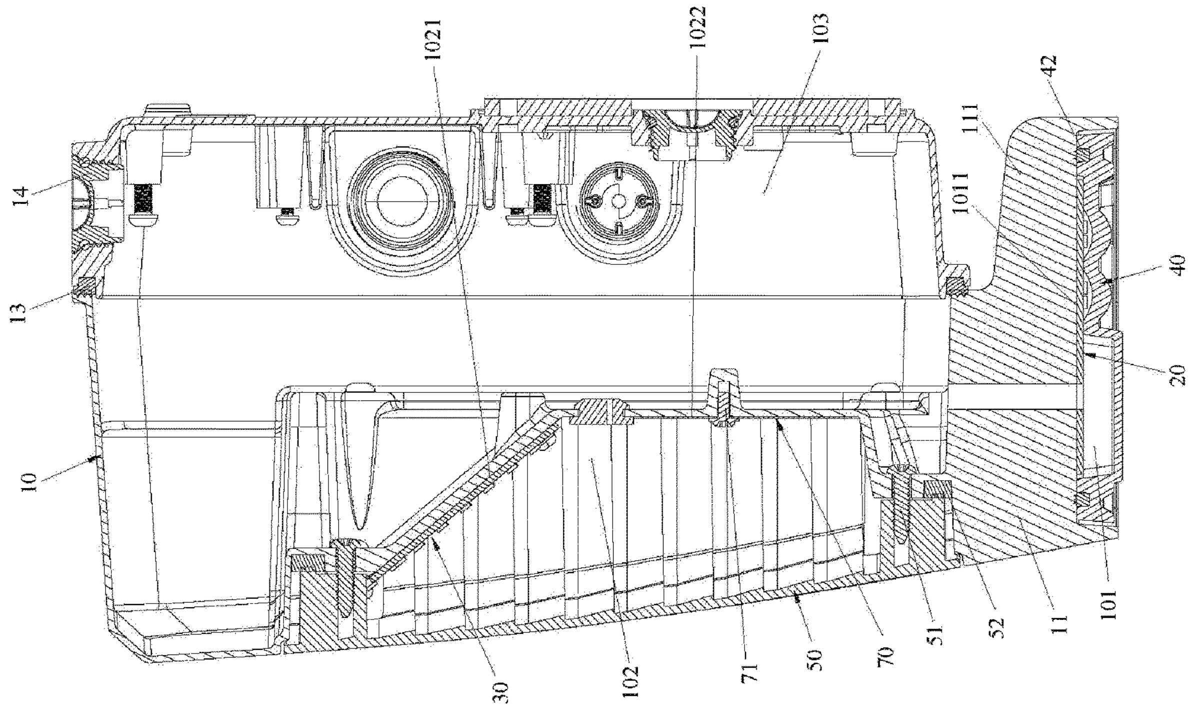
FIG. 6 is a sectional view of the two-in-one wall lamp in accordance with some preferred embodiments of the present disclosure.

Referring to FIG. 1 to FIG. 6, it shows a specific structure of a two-in-one wall lamp in accordance with some preferred embodiments of the present disclosure, including a lamp body 10, a first lamp panel 20, a second lamp panel 30, a lens 40, and a lampshade 50.

Bottom of the lamp body 10 is configured with a first accommodating cavity 101 having an opening downward, and the first accommodating cavity 101 has a horizontal plane 1011 facing downward. A front side of the lamp body 10 is configured with a second accommodating cavity 102 having an opening forward, and the second accommodating cavity 102 has an inclined plane 1021 facing lower forward. Specifically, the lamp body 10 includes a front shell 11 and a rear cover 12, the front shell 11 and the rear cover 12 are sealed front and rear and enclosed to form a closed chamber 103, the first accommodating cavity 101 and the second accommodating cavity 102 are located on the front shell 11 and connected to the closed chamber 103. The front shell 11 and the rear cover 12 are made of thermally conductive metal materials, which is good for heat dissipation. Moreover, the front shell 11 is configured with a plurality of radiator fins 111 extending from thereon and the plurality of radiator fins 111 are located below the rear cover 12, to play a better heat dissipation. A sealing ring 13 is sandwiched between the front shell 11 and the rear cover 12, to achieve better waterproof sealing effect, thereby achieving waterproof IP65 requirements. In addition, the rear cover 12 is configured with a plurality of plugs 14, to achieve waterproof installation and meet the waterproof IP65 requirements. Further, the rear cover 12 is configured with a shock absorbing mounting pad 15, to achieve a damped installation.

One side of the front shell 11 is hinged with one side of the rear cover 12, and the other side of the front shell 11 is secured to the other side of the rear cover 12 by a fixing screw for locking connection. Specifically, the one side of the front shell 11 is configured with two rotary shaft holes 112 arranged spaced upper and lower, the one side of the rear cover 12 is configured with two pivot levers 121 arranged spaced upper and lower accordingly, and the two pivot levers 121 are respectively inserted in the two spindle holes 112 for articulation.

The closed chamber 103 is configured with PC boxes, the PC boxes are configured with function control panels (not shown in the figures) to ensure safety compliance of wirings in the function control panels, and the function control panels are connected to the first lamp panel 20, the second lamp panel 30, and/or power supply 80. Quick wiring bases on the function control panel allows for flexible wire changes and quick installation. In some embodiments of the present disclosure, the PC boxes are two set on left and right, and are respectively located in a first PC box 61 and a second PC box 62. Herein a function control panel in the first PC box 61 is connected to the first lamp panel 20 and the second lamp panel 30, and a function control panel in the second PC box 62 is connected to the power supply 80. Moreover, the function control panel in the first PC box 61 is integrated with a switching color temperature function and a switching angle lighting function, and the function control panel in the second PC box 62 is integrated with a switching power and light sensing function switch and an intelligent timer switch. In addition, the PC boxes are secured to the rear cover 12 by locking screws 601.

Further, the second accommodating cavity 102 is configured with a vertical plane 1022 inside, the vertical surface 1022 is located on a lower side of the inclined plane 1021, and the vertical plane 1022 is configured with a reflective sheet 70, the reflective sheet 70 is used to reflect light. In some embodiments of the present disclosure, the reflective sheet 70 is fixed on the vertical plane 1022 through a plurality of third screws 71. In addition, the vertical plane 1022 is rectangular, and correspondingly, the reflective sheet 70 is also rectangular.

The first lamp panel 20 is affixed to the horizontal plane 1011 for fixation and also located in the first accommodating cavity 101. In some embodiments of the present disclosure, the first lamp panel 20 is secured to the horizontal plane 1011 through a plurality of fourth screws 21, which has a simple structure, easy assembly and solid installation.

The second lamp panel 30 is affixed to the inclined plane 1021 for fixation and also located in the second accommodating cavity 102. In some embodiments of the present disclosure, the second lamp panel 30 is secured to the inclined plane through a plurality of fifth screws 1021.

The lens 40 is a full cut-off lens, and the lens 40 is configured to be disposed at the bottom of the lamp body 10 and be sealed to cover the opening of the first accommodating cavity 101. In some embodiments of the present disclosure, the lens 40 is fixedly connected to the lamp body 10 by a plurality of first screws 41, and a first waterproof ring 42 is sandwiched between an inner circumferentia of the lens 40 and the lamp body 10, to achieve waterproofing and meet the waterproof IP65 requirements.

The lampshade 50 is a half cut-off light lampshade, and the lampshade 50 is configured to be disposed on the front side of the lamp body 10 and be sealed to cover the opening of the second accommodating cavity 102. In some embodiments of the present disclosure, the lampshade 50 is fixedly connected to the lamp body 10 by a plurality of second screws 51 and a second waterproof ring 52 is sandwiched between an inner circumferentia of the lampshade 50 and the lamp body 10, to achieve waterproofing and meet the waterproof IP65 requirements.

Working principle of the two-in-one wall lamp in accordance with some embodiments of the present disclosure is described in detail as follows.

When the first lamp panel 20 is energized, light generated by the first lamp panel 20 is emitted downwards through the lens 40. When the second lamp panel 30 is energized, light generated by the second lamp panel 30 is emitted downwards and forwards through the lampshade 50.

Technical principles of the present disclosure are described above in connection with specific embodiments. These descriptions are intended only to explain principles of the present invention and are not to be construed in any way as a limitation of the scope of protection of the present invention. Based on explanations herein, other specific embodiments of the present disclosure may be obtained without creative labor by those skilled in the art, all of which shall fan within the scope of protection of the present invention.

What is claimed is:

1. A two-in-one wall lamp, comprising a lamp body, a first lamp panel, a second lamp panel, a lens, and a lampshade;

wherein bottom of the lamp body is configured with a first accommodating cavity having an opening downward, and the first accommodating cavity has a horizontal plane facing downward;

wherein a front side of the lamp body is configured with a second accommodating cavity having an opening forward, and the second accommodating cavity has an inclined plane facing lower forward;

wherein the first lamp panel is affixed to the horizontal plane for fixation and also located in the first accommodating cavity;

wherein the second lamp panel is affixed to the inclined plane for fixation and also located in the second accommodating cavity;

wherein the lens is a full cut-off lens, and the lens is configured to be disposed at the bottom of the lamp body and be sealed to cover the opening of the first accommodating cavity; and wherein the lampshade is a half cut-off light lampshade, and the lampshade is configured to be disposed on the front side of the lamp body and be sealed to cover the opening of the second accommodating cavity;

wherein the lamp body comprises a front shell and a rear cover, the front shell and the rear cover are sealed front and rear and enclosed to form a closed chamber the first accommodating cavity and the second accommodating cavity are located on the front shell and connected to the closed chamber;

wherein the closed chamber is configured with power control boxes, the power control boxes are configured with function control panels being connected to the first lamp panel, the second lamp panel or power supply;

wherein the power control boxes are two set on left and right, and are respectively located in a first power control box and a second power control box; wherein a function control panel in the first power control box is connected to the first lamp panel and the second lamp panel, and a function control panel in the second power control box is connected to the power supply; and, wherein the function control panel in the first power control box is integrated with a switching color temperature function and a switching angle lighting function, and the function control panel in the second power control box is integrated with a switching power and light sensing function switch and an intelligent timer switch.

2. The two-in-one wall lamp according to claim 1, wherein the power control boxes are secured to the rear cover by locking screws.

3. The two-in-one wall lamp according to claim 1, wherein the front shell is configured with a plurality of radiator fins extending from thereon and the plurality of radiator fins are located below the rear cover.

4. The two-in-one wall lamp according to claim 1, wherein the rear cover is configured with a plurality of plugs.

5. The two-in-one wall lamp according to claim 1, wherein the rear cover is configured with a shock absorbing mounting pad.

6. The two-in-one wall lamp according to claim 1, wherein the second accommodating cavity is configured with a vertical plane inside, the vertical surface is located on a lower side of the inclined plane, and the vertical plane is configured with a reflective sheet.

7. The two-in-one wall lamp according to claim 1, wherein the reflective sheet is fixed on the vertical plane through a plurality of third screws.

8. The two-in-one wall lamp according to claim 1, wherein the vertical plane is rectangular, and correspondingly, the reflective sheet is also rectangular.

9. The two-in-one wall lamp according to claim 1, wherein the first lamp panel is secured to the horizontal plane through a plurality of fourth screws.

10. The two-in-one wall lamp according to claim 1, wherein the second lamp panel is secured to the inclined plane through a plurality of fifth screws.

* * * * *